April 30, 1935. B. H. PISOW 1,999,254
COMBINATION OPENER AND STOPPER
Filed Dec. 17, 1931
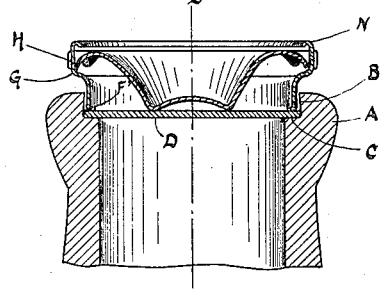
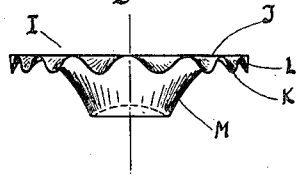
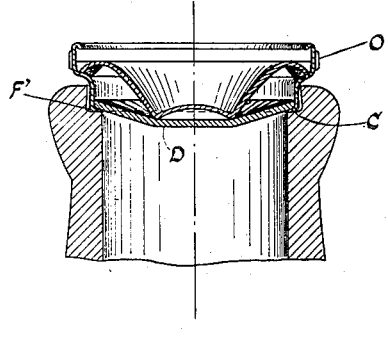
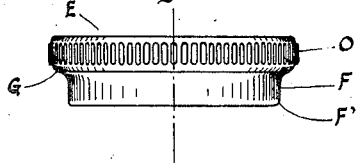
Bruno H. Pisow
INVENTOR
BY Prindle, Bean & Mann
ATTORNEYS Patented Apr. 30, 1935

1,999,254

UNITED STATES PATENT OFFICE 1,999,254

COMBINATION OPENER AND STOPPER

Bruno H. Pisow, Bayside, N. Y.

Application December 17, 1931, Serial No. 581,596

8 Claims. (Cl. 215—55)

The object of my invention has been to provide a device for removing stoppered discs from milk and other bottles, jars or other containers, and especially the paper disc stopper or cap which is commonly used in the ordinary type of milk bottle, which device shall have among other advantages, those of being extremely easy and sure in its operation of removing the cap, and of being capable of use, either alone or in combination with the cap, as a readily removable stopper, and to such ends my invention consists in the combination opener and stopper for pasteboard capped bottles and other containers hereinafter specified.

In the accompanying drawing:

Figure 1 is a sectional view of the upper part of an ordinary milk bottle having my opener in position ready to grasp the cap.

Figure 2 is a similar view showing the opener after it has grasped the cap and is ready for the removal.

Figure 3 is a side elevation of the plunger member of my opener, and

Figure 4 is a similar view of the casing member in which the plunger member is mounted and operated and which grasps the bottle cap.

While for the purposes of illustration, I have chosen the best embodiment of my invention of which I now know, my invention is capable of many possible embodiments, and it is not to be confined to the illustrated embodiment.

In said drawing is represented the neck and mouth of an ordinary milk bottle A. The bottle has a mouth B and a shoulder C upon which is seated a disc D such as the ordinary paper disc which is almost universally used in sealing bottles. It is difficult to remove the disc because its edge is firmly pressed against the vertical wall of the mouth B, (and may be seated in a slight undercut formed in said wall) so that the said edge is not easily accessible when attempting to use a tool to remove the disc. If it is attempted to insert a sharp pointed instrument into the upper side of the disc, the disc will frequently buckle and cause milk to squirt from around its edges.

My opener, on the contrary, not only obtains access to the outer edge of the disc, but gets under it and takes hold of it so that the disc is easily lifted out of the bottle neck.

My opener, in the form in which it is illustrated herein, comprises a casing E having a smaller cylindrical portion F which is adapted to fit the cylindrical wall of the mouth B and to rest upon the disc D. The lower edge of the cylindrical portion F is, as shown in Figs. 1 and 2, slightly turned inward so that it forms a shoulder F' and may be made to grip the underside of the disc in operation, as later to be described. The upper portion G of the casing E is also preferably formed as a cylindrical wall H, and is preferably of larger diameter than the lower portion F to form a hand hold as later described; and a plunger I, such as is shown in Fig. 3 is mounted therein. The plunger as shown, consists of a circular piece of sheet metal J, having its outer edges bent down to form ears K, whose edges constitute in effect, a skeleton cylindrical wall L which may contact with the wall H so as to aid in keeping the disc horizontal, as the plunger moves up and down within the casing, although such guiding is not absolutely necessary. The center of the disc is shaped to form a protuberance M, to rest upon and to act upon the disc, as shown in Figure 1, and as later described. The upper edge N of the casing E is preferably bent over to prevent the plunger from escaping from the casing.

The outer surface of the upper and larger portion G of the casing E is provided with corrugations O so that the casing can readily be grasped by the hand in operation.

In use, my opener is seated in the bottle neck as shown in Figure 1, with its lower cylindrical portion F in the mouth and its lower edge resting upon the upper face of the disc D, and while holding the casing firmly in place, the plunger is pressed down, so as to depress the center of the disc D as shown in Figure 2, and thus cause the outer edge of the disc, by rocking on the corner of the seat C to rise from the said seat. While holding the plunger down, the casing is then preferably pressed down while it is partially rotated in either direction. The dishing of the disc reduces its diameter sufficiently so that pressure on the casing, causes it especially if it be partially rotated in either direction, to pass below the level of the edge of the disc as shown in Figure 2. The pressure on the plunger is then released and the disc springs back more or less to its original flat shape and is thus engaged above the shoulder. When the opener is removed from the bottle it carries the cap with it, notwithstanding the tendency to form a vacuum. The cap can then be expelled from the opener merely by holding the casing and pressing the plunger, or the opener with the cap therein, can be used to again close the bottle. My opener will remove the disc even though the mouth of the bottle be undercut to prevent the cap from accidentally coming out of the bottle.

While it is desirable, it is not necessary, that the lower portion of the casing of my opener, which carries the annular shoulder, should be cylindrical. It would be sufficient to remove the bottle cap disc, if a part were used having a plurality of dependent shoulders which are adapted to be passed below the bottle cap disc and to engage its periphery at such points as between them to clasp the cap and effect its removal from the bottle.

In practice the operation of removing a stopper disc with my opener quickly becomes substantially automatic and almost instantaneous.

What I claim is:

1. In a bottle cap remover, the combination of an annular casing having a cylindrical portion adapted substantially to fit the mouth of a bottle and having an inwardly turned shoulder at the lower edge of said casing, said casing also having a larger annular portion above said first mentioned portion, and a movable part within the casing, said part having a projection that is adapted to form a depression in the bottle cap disc.

2. In a bottle cap remover, the combination of an annular casing having a cylindrical portion adapted substantially to fit the mouth of a bottle and having an inwardly turned shoulder at the lower edge of said casing, a part within the casing having a projection which is adapted to cause a depression in the center of the cap disc, the upper edge of said casing being projected inward so as to prevent said part from escaping from the casing.

3. In a bottle cap remover the combination of an annular casing having a lower cylindrical part carrying an inwardly turned shoulder at its lower edge, said casing having a larger cylindrical part above said first mentioned part, a plunger mounted in said casing and having a projection which is adapted to cause a bottle cap disc to assume a dished shape, said plunger being of greater diameter than said first mentioned part, said casing having an inturned flange to prevent said plunger from escaping from said casing.

4. A bottle cap remover comprising a part having a plurality of dependent shoulders adapted to be passed below a bottle cap disc and to engage its periphery at such points as between them to clasp the cap and effect its removal from the bottles.

5. In a bottle cap remover, the combination of means carrying a shoulder and means movably mounted in said first means and projectable downwardly below said shoulder for causing the bottle cap disc to assume a dish shape, whereby the periphery of the disc shall be raised from its seat above the level of said shoulder and the shoulder passed below said periphery.

6. In a bottle cap remover, the combination of a bottle having a substantially cylindrical mouth, and a seat for a cap disc means carrying a shoulder and means movably mounted in said first means and projectable downwardly below said shoulder for depressing the center of the disc whereby the edge of the disc may be raised from its seat and said shoulder passed below said edge.

7. A bottle opener comprising the combination of an annular casing having a shoulder at its lower edge which is adapted to engage under the outer edge of the cap disc, and a plunger mounted in said casing, said plunger having a projection which is adapted to cause a depression in the center of the cap disc whereby the edge of the disc is lifted to engage on said shoulder.

8. A bottle opener comprising the combination of an annular casing having a shoulder at its lower edge, which is adapted to engage under the outer edge of the cap disc, and a movable part within the casing having a projection which is adapted to cause a depression in the center of the cap disc whereby the edge of the disc is lifted to engage on said shoulder.

BRUNO H. PISOW.